US012352105B2

(12) United States Patent
Heissenberg

(10) Patent No.: US 12,352,105 B2
(45) Date of Patent: Jul. 8, 2025

(54) SCREEN RETENTION TRACK

(71) Applicant: Michael Heissenberg, Port St. Lucie, FL (US)

(72) Inventor: Michael Heissenberg, Port St. Lucie, FL (US)

( * ) Notice: Subject to any disclaimer, the term of this patent is extended or adjusted under 35 U.S.C. 154(b) by 351 days.

(21) Appl. No.: 17/820,326

(22) Filed: Aug. 17, 2022

(65) Prior Publication Data

US 2024/0060362 A1 Feb. 22, 2024

(51) Int. Cl.
*E06B 9/17* (2006.01)
*E06B 9/58* (2006.01)
*E06B 9/13* (2006.01)

(52) U.S. Cl.
CPC ................ *E06B 9/581* (2013.01); *E06B 9/17* (2013.01); *E06B 9/13* (2013.01); *E06B 2009/588* (2013.01)

(58) Field of Classification Search
CPC . E06B 9/58; E06B 9/581; E06B 9/582; E06B 2009/588; E06B 9/13; E06B 2009/005; E06B 9/17
See application file for complete search history.

(56) References Cited

U.S. PATENT DOCUMENTS 7,389,807 B2 * 6/2008 Nagare ..................... E06B 9/13 160/273.1
8,607,841 B2 12/2013 Hayashiguchi
8,662,138 B2 * 3/2014 Komatsu ................... E06B 9/42 160/273.1
10,260,279 B2 * 4/2019 Nakae ........................ E06B 9/40
2004/0020611 A1 * 2/2004 Coenraets ................. E06B 9/13 160/188
2005/0005545 A1 * 1/2005 Jerry ....................... E06B 9/581 52/204.5
2005/0067116 A1 * 3/2005 Ceccofiglio ............. E06B 9/581 160/133
2006/0137836 A1 6/2006 Harbison
2007/0221341 A1 * 9/2007 Schanz ..................... E06B 9/58 160/133
2011/0253323 A1 * 10/2011 Bowman ............. E06B 9/17046 160/323.1
2012/0255687 A1 * 10/2012 Komatsu ................ E06B 9/581 160/310
2012/0325416 A1 * 12/2012 Hayashiguchi ......... E06B 9/581 160/272
2017/0211315 A1 * 7/2017 Fleischman ............... E06B 9/13
2020/0318430 A1 10/2020 Heissenberg
2021/0262284 A1 8/2021 Arthur et al.

* cited by examiner

*Primary Examiner* — Daniel P Cahn
*Assistant Examiner* — Matthew R. Shepherd
(74) *Attorney, Agent, or Firm* — McHale & Slavin, P.A.

(57) ABSTRACT

A screen attachment formed from a track having a centrally disposed chamber for receipt of a base member constructed and arranged to receive a beaded edge of a flexible hurricane screen. The base member employs an opening having a shaped entry. The base member is movable between a contracted position to an expanded position, wherein the shaped entry is deformed to cause a pinching of the beaded edge. The base member includes an expansion member to maintain the base member in a contracted position when possible. A clip can be added to support and reinforce a zipper beaded edge which allows an operator to raise a base slat well into an upper housing without the zipper exiting the track.

5 Claims, 6 Drawing Sheets

SCREEN RETENTION TRACK

FIELD OF THE INVENTION

The present invention relates to the field of hurricane protection and, more particularly, to a retention track for securing screens used in high wind environments.

BACKGROUND OF THE INVENTION

Property protection is of paramount importance to property owners. Damage from high winds is preventable by covering openings, patios, and the like structures that are susceptible to high winds. For instance, hurricane force winds can quickly breach an opening of a structure, resulting in extensive damage. Windows and doors, if pierced open by flying debris, place the entire structure at risk. Once winds are allowed inside a property, debris and wind changes the air pressure quickly and intensely. Within minutes, the change in air pressure with wind accompaniment can lift the roof of the property right off. In many instances, the breach of a single opening can cause the detachment of a roof, wherein all the contents of the home are exposed and likely destroyed. Covered patios are but another example of property areas that can be damaged if wind is able to get below the roof.

Hurricane shutters are well known in their ability to prevent wind breaching. In many instances, the use of screens have become a desirable alternative, as the screening is less weight and easier to store. In many instances, the screens can be stored on site using a retractable system, or edges fed through channels to provide securement without additional fasteners. Mechanisms used to secure a screen to a fixed structure can be problematic, as the screening is a thin piece of material that requires framing. For high winds, a screen having a continuous edge attachment is more secure than a screen having spaced apart fasteners. While screens allow some wind to pass, if rain is present, the water acts as a wind barrier wherein no wind can pass through the screen. When this occurs, the screen acts as a sail and subjects the fasteners to the highest possible pressures.

Various prior art references address ways of securing a screen. Applicant's patent Registration U.S. Pat. No. 11,326,395, entitled "Retractable Screen with Tensioning Track," the contents of which are incorporated herein by reference, discloses a tensioning track used for retractable screens.

U.S. Patent Publication 2006/0137836 discloses a sealing curtain assembly having a pair of tracks attached to opposite sides of an opening. Each track includes a spring system which urges the tracks outwardly to maintain the curtain taut. The spring system employs a connecting member, preferably a bolt, which allows the track edges to separate from a frame member. In one embodiment, a compression spring and washer are located between the head of each connecting member and track. A problem with the use of spring-loaded connecting members is that the spacing between each member provides an area for the screen to bind between connecting members.

U.S. Pat. No. 8,607,841 discloses a screen device having inner rails that are embedded inside fixed guide rails which guide protrusions at side edges of a screen which is wound via a take-up shaft. Each inner rail has a guide groove in which the guide protrusion is inserted, and inward flanges are provided at an opening of the guide groove. Rail members have outer side protrusions and inner side protrusions of different heights at both side edges of a rail base plate. The higher outer side protrusions are confronting. A micro gap extends between the lower inner side protrusions into the guide groove such that the micro gap is opposed to a guide gap formed between the opposed inward flanges. The guide protrusion is slid and guided in a come-off preventing state by the inner side protrusion, so that an extremely thin fastener element can be used as the guide protrusion. While spacing of the screen edge allows for movement, the use of an inner guide rail that is spaced apart allows for screen wrinkles.

What is needed in the art is a screen retention track wherein locking strength increases with the amount of wind the screen is subjected too.

SUMMARY OF THE INVENTION

Disclosed is a screen track having a centrally disposed chamber for receipt of a base member constructed and arranged to receive a beaded edge of a flexible screen. The base member employs an opening having a shaped entry. The base member is movable between a contracted position to an expanded position where in one embodiment the shaped entry is deformed to cause a pinching of the beaded edge in relation to the amount of wind pressure placed against the screen. In another embodiment the base member is movable between a contracted position to an expanded position to provide base slat retention. The base member includes an expansion member to maintain the base member in a contracted position. A clip supports and reinforces the beaded edge, preferably a zipper, all the way down to the bottom of a base slat for better operation which allows an operator to raise the base slate well into an upper housing without the zipper exiting the track.

It is an objective of the invention to provide a secure screen attachment wherein clamping pressure increases in relation to the amount of wind pressure applied to the screen.

Still another objective of the invention is to teach a clamping mechanism capable of pinching the edge of a screen in reaction to the force of the wind.

Yet still another objective of the invention is to include a housing member to place a consistent tension on a flexible screen.

Another objective of the invention is to teach the use of a beaded edge, namely a zipper edge, for use in combination with a clamping member.

Still another objective of the invention is to teach the use of a clip to support and reinforce a zippered edge, all the way down to the bottom of a base slat for better operation, wherein an operator can raise the base slat well into an upper housing without the beaded edge exiting the track.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
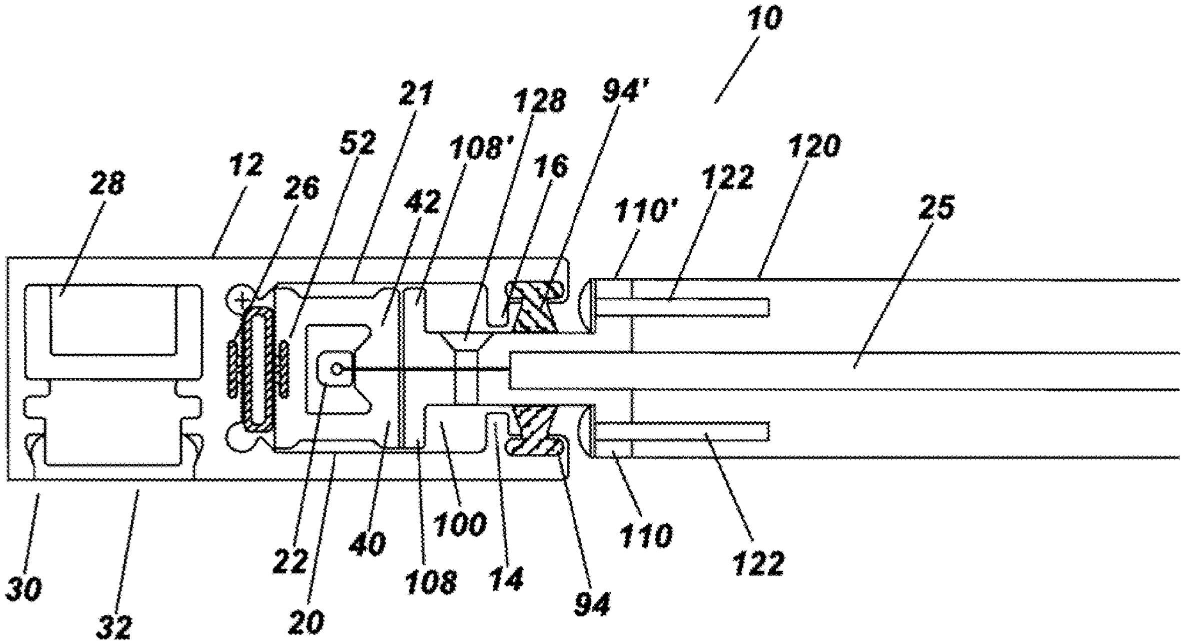
FIG. 1 is a side view of a base slat under minimum force.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring now to the Figures in general, illustrated is a screen track assembly 10 having one embodiment for retention of a screen edge and another embodiment for retention of base slat in combination with a screen edge. The track assembly 10 allowing for either embodiment. The track assembly 10 is preferably constructed of aluminum having a centrally disposed chamber 12 extending along a longitudinal length and defined by upper wall projections 14, 16 separated by an opening 18. The chamber 12 has first and second opposing side walls 20, 21 and a bottom wall 24. A cap 32 snaps onto the track assembly 10 to provide a finished look.

A lower receptacle 26 is formed along a lower section 30 for securing an expansion member 70. The expansion member secured to a base member 40 having an upper receptacle 52 forming an expansion member attachment sleeve attachment. The base member 40 is constructed and arranged to receive a beaded edge 22 of a flexible screen 25 through an opening 34 having a shaped entry 42, defined as a lip having a maximum width W1 proximate to the opening 34, and minimal width W2 at a distance from the opening 34, wherein the shaped entry 42 closes the opening 34 when the hurricane screen is withdrawn, essentially pinching the screen 25, preventing the beaded edge 22 from removal. The base member 40 is preferably constructed from plastic, such as PVC or the like plastic, that retains its shape. The base member 40 is defined by a bottom wall 50 with an upper expansion member receptacle 52, a left side wall 54 having a left lower raised edge 56, a first upper wall 58 having a left upper raised edge 60, a second upper wall 62 having a right upper raised edge 64, and a right-side wall 66 having a right lower raised edge 68. The raised edges provide minimal surface contact to allow ease of base member 40 movement from a contracted position to an expanded position. The expansion member 70 has a first tab 72 coupled to the upper receptacle 52 formed in the base member 40, and a second tab 74 coupled to the lower receptacle 26 formed in the track 12. The expansion member 70 is an elastomeric material selected from the group consisting of rubber, silicon, and PVC based flexible material. The base member 40 is movable from the contracted position to the expanded position as wind impacts the screening. The expansion member 70 keeps the screen in a taut position and provides shock absorption when the screen is impacted with debris or the wind becomes stronger. The expansion member 70 is constructed and arranged to draw the base member 40 towards the contracted position.

Figure 5:
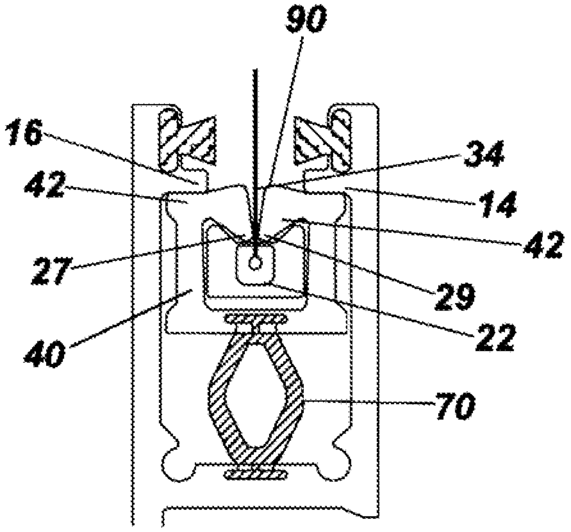
FIG. 5 is a side view of the screen track with the base member under maximum force.
Figure 6:
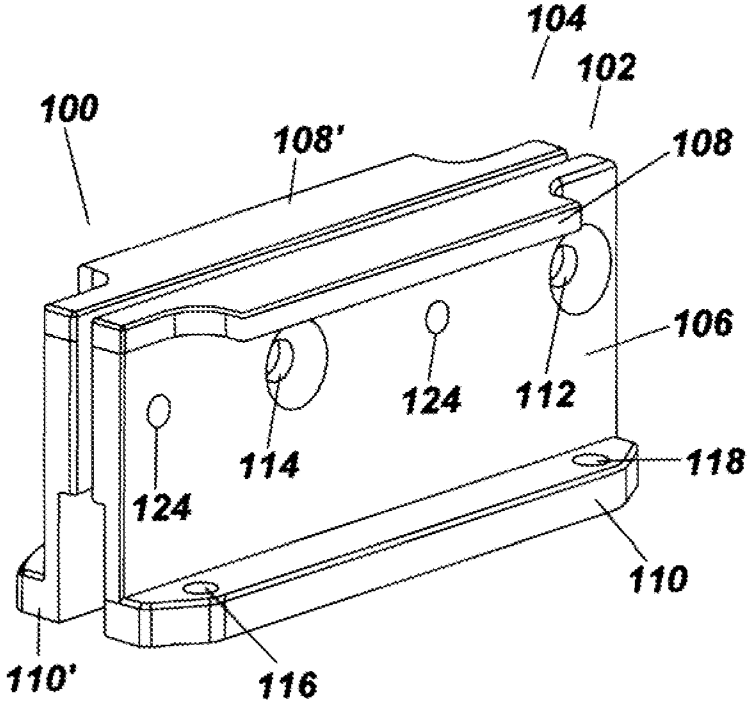
FIG. 6 is a perspective view of a clip.
Figure 7:
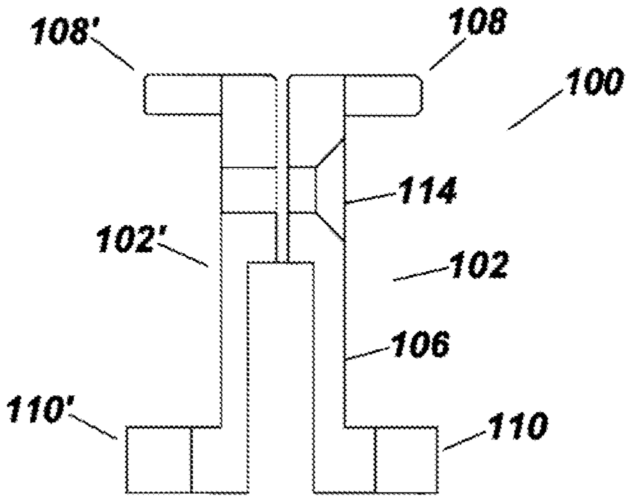
FIG. 7 is a cross-sectional end view of FIG. 6.
Figure 8:
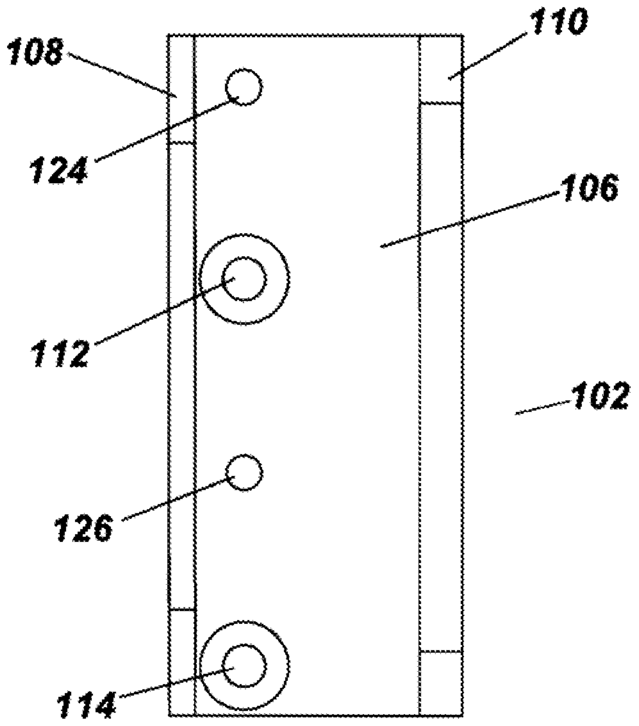
FIG. 8 is a side view of FIG. 6.

In one embodiment, should screen deflection become overly bearing, as shown in FIG. 5, the beaded edge 22 is drawn to the toward the opening 34 where the beaded edge 22 engages the shaped entry 42 which closes the opening 34 by pinching the edges 27, 29 together, preventing the beaded edge 22 from removal. The wall projections 14, 16 operate to prevent the base member 40 from removal from the chamber 12. In a preferred embodiment, the beaded edge 22 is further defined as a Delrin zipper, wherein the beaded edge 22 can be easily moved about a corner, or placed on a roll wherein the screen is used in a retractable format. The shaped entry 42 having an inward slant. As the pressures are applied to the screen, the forces begin to pivot the material around the wall projections 14, 16 and cause the pinching effect.

In another embodiment a clip 100 is employed for base slat retention. The clip 100 is constructed from two pieces 102, 102' securing an edge of the screen 25 therebetween; the first piece 102 having a length of about 3 inches and defined by a sidewall 106 with an L-shaped lip 108 formed along a proximal end and a L-shaped base 110 formed along a distal end. In a preferred embodiment, the first piece 102 has first and second countersunk apertures 112, 114 and threaded apertures 124, 126. Threaded apertures 124, 126 are for receipt of a fastener 128. Apertures 116, 118 in the L-shaped base 110 employ a fastener 122 for securing to a self-leveling aluminum base slat 120. The second piece 102' forms a mirror image of the first piece 102, allowing a reduction in inventory by making the pieces 102' and 102 interchangeable.

The L-shaped lips 108, 108' fit within the chamber 12 and cannot be removed once the fasteners 128 are attached. The L-shaped lips 108, 108' engage wall projections 14, 16 when the base member 40 is in an extended position. The felt wipers 94, 94' engage side walls 102, 102' to reduce the opportunity for aluminum marring and inhibit debris from entering the chamber. The clip 100 supports and reinforces the beaded edge, preferably a zipper, all the way down to the bottom of a base slat for better operation and allows an operator to raise the base slat well into an upper housing without the beaded edge exiting the track.

The opening 90 for passage of the screen 25 to the base member 40 includes a first channel 92 for receipt of a felt wiper 94 on one side of the screen 25, and a second channel 92' for receipt of a felt wiper 94' on an opposite side of the screen 25. When used in combination with a slat base, the felt wiper engages each side of the slat.

Figure 2:
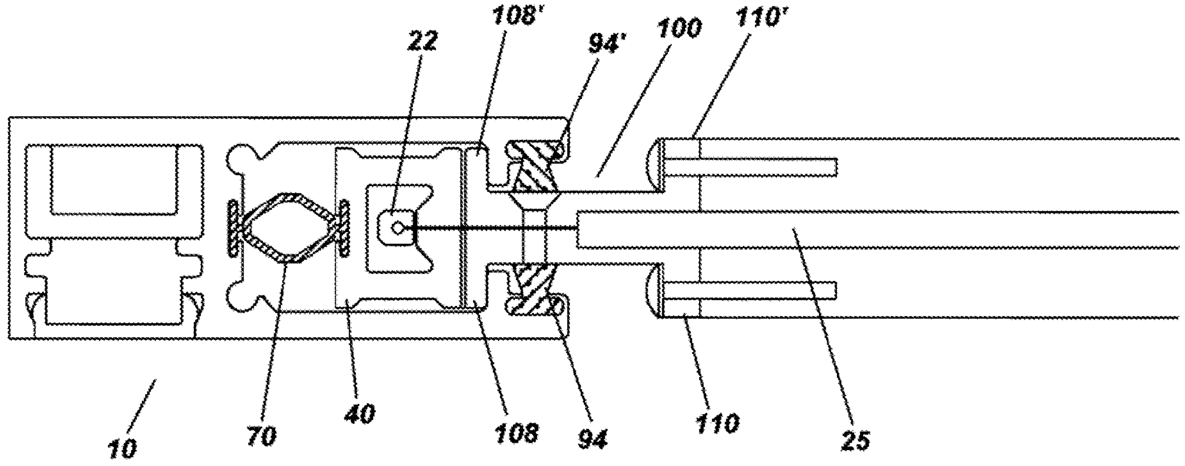
FIG. 2 is a side view of a base slat under maximum force

FIGS. 1-2 depict the base slat 120. FIG. 1 depicts a base slat 120 in retention under minimum force, FIG. 2 depicts the base slat 120 in retention under maximum force wherein the expansion member 70 is expanded and the L-shaped lips 108, 108' engage wall projections 14, 16 to limit expansion member 70 extension.

Figure 3:
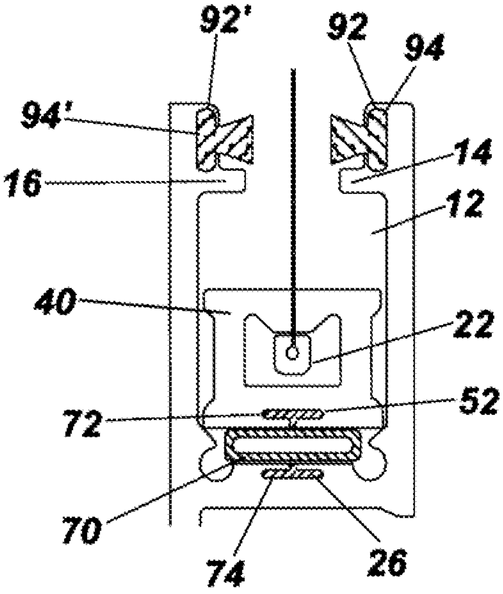
FIG. 3 is a side view of the screen track with a base member under minimum force.
Figure 4:
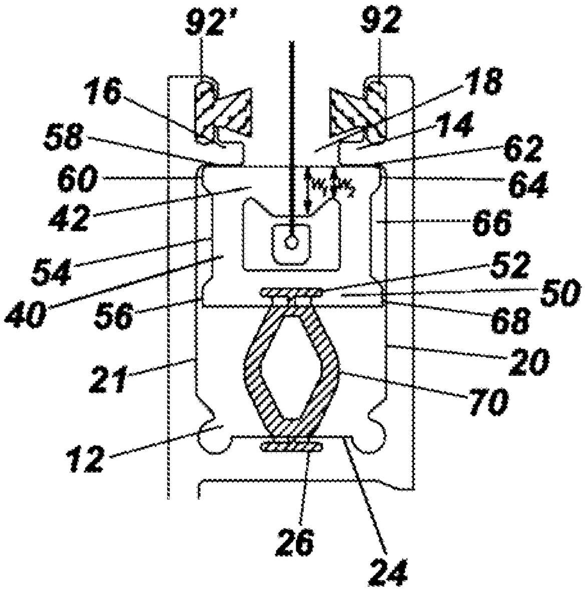
FIG. 4 is a side view of the screen track with the base member in an expanded position.

FIGS. 3-5 depict screen attachment. FIG. 3 is a side view of the screen track 12 with the base member 40 under minimum force, FIG. 4 is a side view of the screen track 12 with the base member 40 an expanded position; and FIG. 5 is a side view of the screen track 12 with the base member 40 under maximum force.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A screen track attachment for a hurricane screen having at least one beaded edge comprising:

a track having a centrally disposed chamber extending along a longitudinal length of said track, said chamber defined by wall projections forming a passageway;

a base member constructed and arranged to receive a beaded edge of a flexible hurricane screen, Said base member comprising an opening defined by opposing lips, each lip having a first width W1 proximate to an entry point of said opening and a second width W2 at a distance from said entry point wherein said first width W1 is greater than said second W2 forming an inward slant for each said opposing lips, said base member further including raised upper edges constructed and arranged to engage said opposing lips wherein said base member is movable within said track chamber;

an expansion member having a first tab coupled to said base member and a second tab coupled to said track;

a clip secured to an edge of said hurricane screen, said clip having L-shaped lips to engage wall projections within said chamber when the base member is in an extended position wherein said clip allows a slat slate to extend into an upper housing without said beaded edge being removed from said track;

wherein said base member is movable from a contracted position to an expanded position by wind pressure applied to the hurricane screen;

wherein said expansion member is constructed and arranged to draw said base member towards said contracted position;

wherein said opening of said base member is constructed and arranged to increase gripping forces of said hurricane screen as said raised upper edges engage said opposing lips in reaction to wind pressure by pinching said hurricane screen when said inward slant of each said opposing lip allows said base member to be drawn into said opening which prevents removal of said hurricane screen.

2. The screen track according to claim 1 including a first felt strip coupled to a first channel in a first inner side of said track and a second felt strip coupled to a second channel in a second inner side of said track, wherein said first and second felt strips are positioned on opposite sides of said screen.

3. The screen track according to claim 1 wherein said base member includes raised edges for slidable engagement with walls of said chamber.

4. The screen track according to claim 1 wherein said base member is plastic.

5. The screen track according to claim 1 wherein said expansion member is an elastomeric material selected from the group consisting of: rubber, silicon, or a PVC flexible material.

* * * * *